(12) United States Patent
Rao et al.

(10) Patent No.: US 8,976,081 B2
(45) Date of Patent: Mar. 10, 2015

(54) INTEGRATION OF DISPLAYS

(71) Applicants: Raghavendra Ramesh Rao, Bangalore (IN); Arvind Sundaram, Bangalore (IN)

(72) Inventors: Raghavendra Ramesh Rao, Bangalore (IN); Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 13/654,265

(22) Filed: Oct. 17, 2012

(65) Prior Publication Data
US 2014/0104246 A1   Apr. 17, 2014

(51) Int. Cl.
*G09G 5/00* (2006.01)
*G02F 1/1333* (2006.01)
*G06F 3/14* (2006.01)

(52) U.S. Cl.
CPC .............. *G09G 5/00* (2013.01); *G02F 1/13336* (2013.01); *G06F 3/1446* (2013.01); *G09G 2300/026* (2013.01); *G09G 2340/0407* (2013.01); *G09G 2360/06* (2013.01)
USPC .......................................... 345/1.3; 345/204

(58) Field of Classification Search
CPC ............................ G06F 3/1446; G09G 3/2088
USPC ................................................... 345/1.3
See application file for complete search history.

(56) References Cited

U.S. PATENT DOCUMENTS

| | | | | |
|---|---|---|---|---|
| 5,673,091 A | * | 9/1997 | Boisdron et al. | 349/58 |
| 5,833,465 A | * | 11/1998 | Jarzewiak | 434/171 |
| 7,362,046 B2 | * | 4/2008 | Aston | 313/498 |
| 8,305,294 B2 | * | 11/2012 | Cok et al. | 345/1.3 |
| 8,371,894 B1 | * | 2/2013 | Rosen et al. | 446/91 |
| 2002/0074937 A1 | * | 6/2002 | Guberman et al. | 313/511 |
| 2002/0118320 A1 | * | 8/2002 | Bayrle et al. | 349/73 |
| 2004/0256977 A1 | * | 12/2004 | Aston | 313/498 |
| 2011/0057861 A1 | * | 3/2011 | Cok et al. | 345/1.3 |
| 2011/0176292 A1 | * | 7/2011 | Lee | 362/97.1 |
| 2011/0260949 A1 | * | 10/2011 | Ahn et al. | 345/1.3 |
| 2012/0062540 A1 | * | 3/2012 | Quadri et al. | 345/211 |

* cited by examiner

*Primary Examiner* — Alexander Eisen
*Assistant Examiner* — Sanjiv D Patel
(74) *Attorney, Agent, or Firm* — Blakely, Sokoloff, Taylor & Zafman LLP

(57) ABSTRACT

An integrated display panel (IDP) is created by integrating two or more modified component display panels. Each of the two or more modified component display panels include an active region, which may be extended until at least one of the edges. A first set of layers of a first modified component display panel and a second set of layers of the second modified is removed along an edge while manufacturing the first and second modified component display panels. The first and the second modified component display panels are overlapped along the edge to form a junction. At the junction, the back light from a lower layer is allowed to pass through until it reaches a top layer of the IDP. The graphics is displayed, seamlessly, in an active area of the IDP without forming a dark band at the junction of the first and the second modified component display panel.

12 Claims, 8 Drawing Sheets

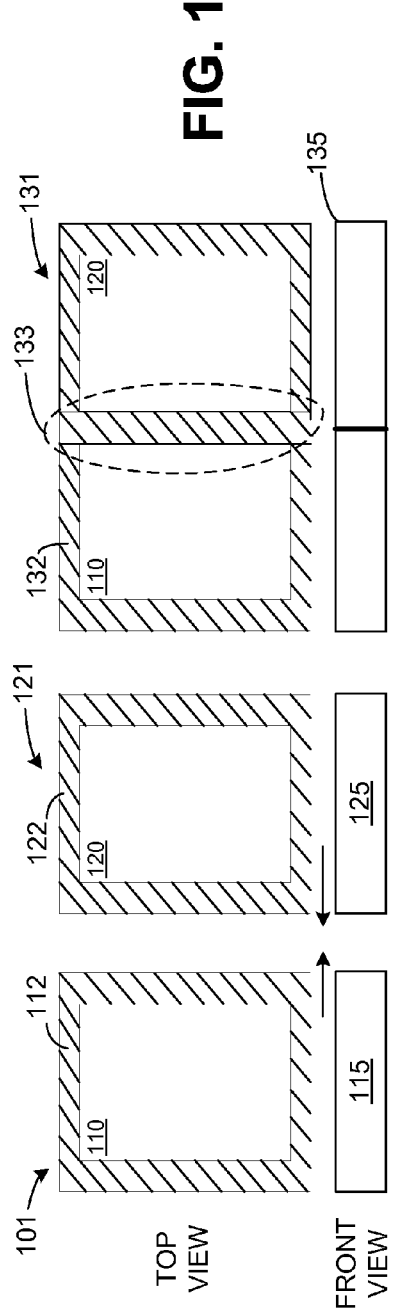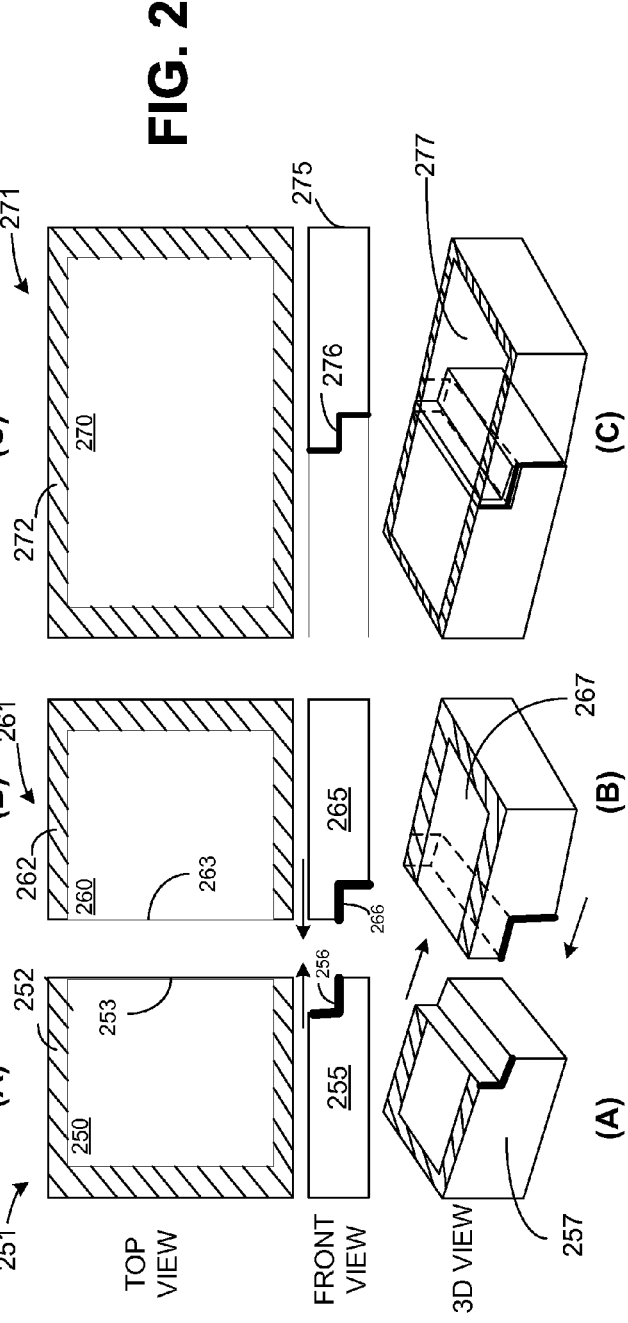

INTEGRATION OF DISPLAYS

BACKGROUND

A number of displays technologies such as liquid crystal display (LCD), light emitting diode (LED) backlit LCD, organic light emitting diode (OLED), are available in the market place today. These displays are available in various sizes (form factors). Also, these displays, mostly, are hard glass devices and may not be flexible (for example, to fold, roll, etc). Further, the price of these displays increase almost exponentially with an increase in the screen size (i.e., length and breadth). One of the approaches that have been devised is to couple two or more displays to increase the screen size while minimizing the cost.

However, the displays, generally, include a larger active area and a comparatively smaller inactive area (shaded area). For handling the displays during the manufacture phase, a fixed area (for example, area covering X pixels) along the border of the displays may be made inactive and this inactive area is referred to as the "porch". FIG. 1(a) depicts a first display 101, which includes, an active area 110 surrounded by an inactive area 112 and the front view 115 depicts an uniform thickness of the porch along the width of the first display 101. FIG. 1(b) depicts a second display 121, which includes, an active area 120 surrounded by an inactive area 122 and the front view 125 depicts an uniform thickness of the porch along the width of the second display 121. Such an approach may lead forming of a dark band 133 at the junction of the first and the second displays 101 and 121 if the first and second displays 101 and 121 are combined to form a larger display 131. The front view 135 depicts a uniform thickness of the porch along the width of the combined display 131.

Also, the edges of the first and the second display 101 and 121 may be metalized and due to manufacturing limitations the edges may be physical imperfect. Due to physical imperfections, the two displays 101 and 121 may not be adjoined, seamlessly, end to end. This disjointment of the two displays 101 and 121 at the edges may result in visually observable imperfections.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a first display panel 101 (FIG. 1A), a second display panel 121 (FIG. 1B), and a combined display panel 131 (FIG. 1C), which depicts a dark band at the junction of the first and second display.

FIG. 2 illustrates a modified first component display panel 251 (FIG. 2A), a modified second component display 261 (FIG. 2B), and an integrated display (FIG. 2C), which may not have a dark band at the junction of the modified first and second component display panels 251 and 261 according to one embodiment.

DETAILED DESCRIPTION

The following description describes embodiments of an integrated digital display. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 4:
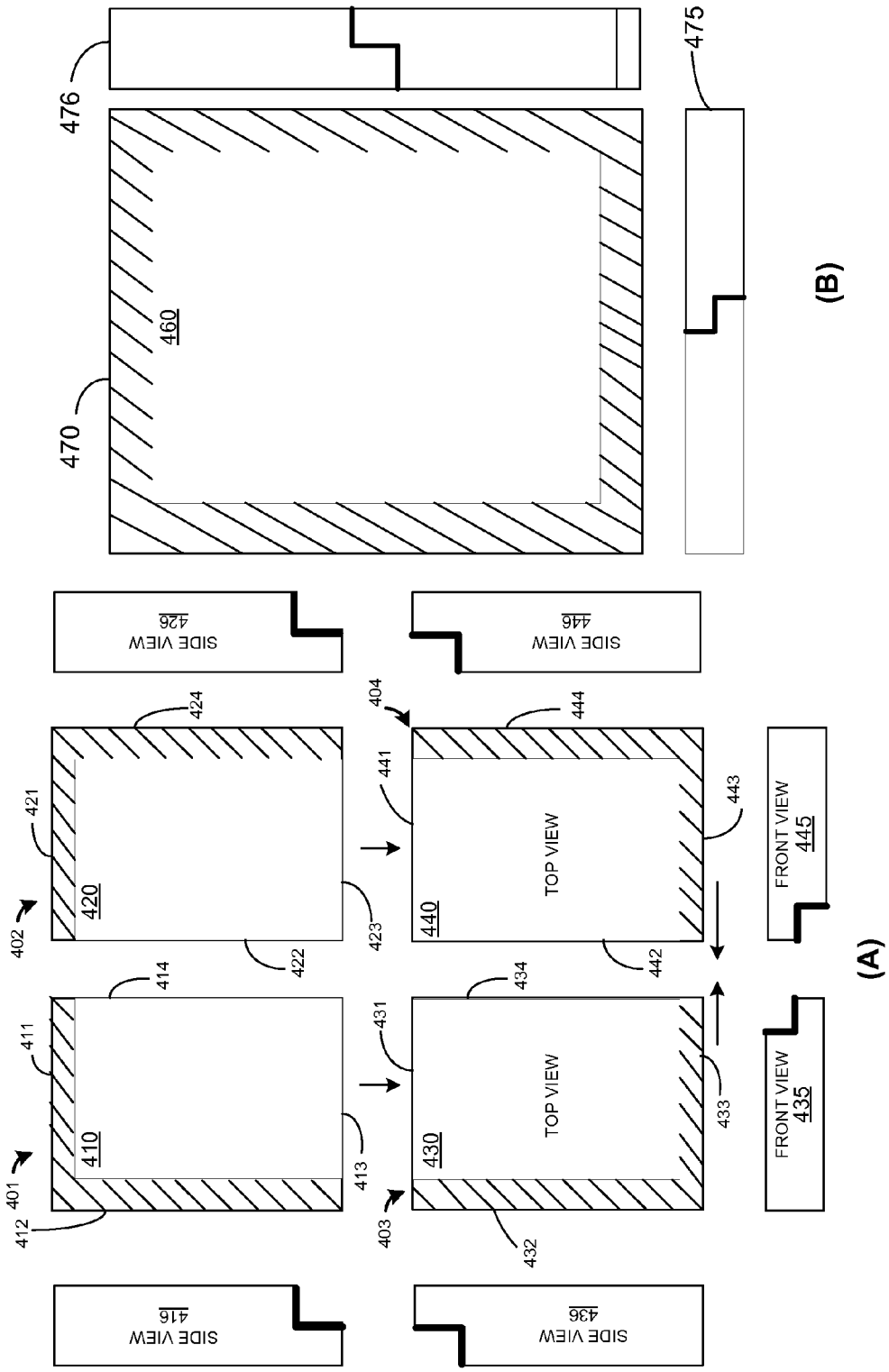
FIG. 4 illustrates modified digital displays 401, 421, 431, and 441 (FIG. 4A) and an integrated digital display 471 formed by integrating the modified digital displays 401, 421, 431, and 441 according to one embodiment.

In one embodiment, while manufacturing one or more modified component display panels (smaller displays), the active area of each of the modified component display panel may be extended until the edge of the display panel. In one embodiment, if two modified component display panels are integrated (as depicted in FIG. 2, for example, referred to as "uni-directional integration", hereafter) along a direction (horizontal or vertical) then the active area of the modified component display panels may be extended until the physical edge of the display. Likewise, in one embodiment, if four modified component display panels (smaller panels) are to be integrated (as depicted in FIG. 4, for example, referred to as "two-directional integration", hereafter) along two directions (horizontal and vertical) then the active area may be extended, until at least two physical edges of the display. In other embodiments, the displays including more or less than four edges may also be used to create an integrated displays and such displays may be manufactured, for example, in a triangle, rectangle, pentagon, hexagon, octagon, and any other such polygons and other shapes such as circles and semi-circles. Further, circular and semi-circular modified component displays may also be used to create an integrated display. Only for illustration purposes, the diagrams and the detailed description here uses modified component displays with four edges and similar techniques may be used to create an integrated display for modified component displays of other shapes as well.

While manufacturing the modified component display panels for uni-directional integration, in one embodiment, a first set of layers starting from the top of a first modified component display panel may be removed to form an "L" shape (as depicted by the highlighted portion 256 in the front view 255) at one of the edges of the first modified component display panel. Further, a second set of layers starting from the bottom of a second modified component display panel may be removed to form an "inverted L" shape (as depicted by the highlighted portion 266 in the front view 265). In one embodiment, the first and the second modified component display panels may form an integration panel pair. In other embodiment, the first and the second modified component display panels may be manufactured using standard moulds and the need for removing the first set and the second set of layers may not be required.

In the above embodiment, as an example, integrating two modified component display panels is described, however, other combinations such as integrating X display panels of same form factor or integrating Y display panels of different form factors to form an integrated display panel is also possible and such variations are contemplated to be within the scope of the embodiments of the invention.

In one embodiment, the user may be allowed to provide display configuration inputs and the data stored in the data buffers coupled to one of the modified component display panels (smaller displays) may be rendered on the integrated display (bigger display). In other embodiment, the user may be allowed to provide inputs related to the number of modified component display panels being integrated and a graphics driver or a hardware component or a combination of a hardware and software components may use the user inputs to determine the total number of pixels on the integrated display. In one embodiment, the contents (or display data) in the data buffers coupled to one of the modified component display panels may be mapped to the pixels of the integrated display if a single display controller is used to render the graphics on the integrated display. In other embodiments, the contents (or display data) in the data buffers coupled to the first and the second modified component display panels may be mapped to the pixels of the integrated display if a two display controllers are used to render the graphics on the integrated display. Further, the touch coordinates of a single display may not be the same as that of the integrated display, thus a touch logic may determine the new touch coordinates for the integrated display.

An embodiment of creating an integrated display panel 271 by integrating two modified component display panels 251 and 261 is illustrated in FIG. 2. FIG. 2A illustrates a top view 251, a front view 255, and a three dimensional (3D) view 257 of a first modified component display panel 251. In one embodiment, the top view of the panel 251 illustrates that the first modified component display panel 251 may include an active area 250 surrounded by a porch 252 (depicted by a shaded area) along the three edges. In one embodiment, the active area 250 may be extended, for example, until the physical limit of the fourth edge 253 of the display panel 251. Further, few top layers along the fourth edge 253 of the first modified component display panel 251 may be removed as depicted in the front view 255. The removal of a few top layers may cause an "L" shaped groove, as depicted by 256, to be formed in the first modified component display panel 251. In one embodiment, the 3D view 257 also depicts the "L" shaped groove from the side view and a porch covering an area along the three edges and the active area 250 extending up until the physical limit of the fourth edge 253 is depicted in the top layer. Further, the horizontal and vertical sides of the "L" shaped groove may not be metalized.

Similarly, FIG. 2B depicts a top view, a front view, and a 3D view of the second modified component display panel 261. In one embodiment, the top view of the second component display panel 261 may include an active area 260 surrounded by a porch 262 (depicted by a shaded area) along the three edges. In one embodiment, the active area 260 may be extended, for example, until the physical limit of a fourth edge 263. Further, few bottom layers along the edge 263 of the second modified component display panel 261 may be removed as depicted in the front view 265. In one embodiment, the bottom layers removed from the second modified component display panel 261 may not include any of the layers included in the few top layers removed from the first modified component display panel 251. Such an approach may ensure that the combination of the few top layers (first set of layers) and the bottom layers (second set of layers) form a complete set of layers in a display panel without repetition of the layers. In one embodiment, the first and second set together may form one complete set of layers included in an integrated display panel 271. In one embodiment, a single layer within the first or the set may be distributed between the first and the second modified component display panels 251 and 261.

The removal of few bottom layers from the second modified component display 261 panel may cause an "inverted L" shaped groove, as depicted by 266, to be formed in the second modified component display panel 261. In one embodiment, the 3D view 267 also depicts the "inverted L" shaped groove from the side view and a porch covering an area along the three edges and the active area 260 extending up until the physical limit of the fourth edge 263 is depicted in the top view. Further, the horizontal and vertical sides of the "inverted L" shaped groove may not be metalized.

In one embodiment, the FIG. 2C depicts a top view 271, a front view 275, and a 3D view 277 of an integrated display panel 271. In one embodiment, the top view illustrates that the integrated display panel 271 may include an active area 270 surrounded by a porch 272 (depicted by a shaded area) along the four edges of the integrated display panel 271. In one embodiment, the integrated display panel 271 may not include a dark band at the junction of the first and second modified component display panels 251 and 261 compared to a dark band 133 as depicted in FIG. 1C. In one embodiment, extending of the active areas 250 and 260 until the physical limit of the fourth edges 253 and 263, respectively, and non-metallization of the "L" and "inverted L" edges may allow the light from the bottom layers to pass through the underlying layers and reach the top layer. Thus, in one embodiment, the integrated display panel 271 may be void of the dark band and the first and the second modified component display panels 251 and 261 may be integrated, seamlessly. Such an approach may enable the display data to be displayed, seamlessly, on the integrated display panel 271 that may create an enhanced user experience at a lower cost. As the horizontal and vertical sides of the "L" shaped groove and the "inverted L" shaped groove of the first and second modified component display panels 251 and 261 may not be metalized, the light (backlight) may pass through the lower layers of the first modified component display panel 251 and the top layers of the second modified component display panel 261 to reach the top most layer of the integrated display panel 271. In one embodiment, the integrated display panel 271 described is depicted as a rectangular shaped structure. However, in other embodiments, the integrated display panel 271 may be flexible, foldable, and may be formed in various shapes and sizes.

In one embodiment, the front view 275 depicts the junction 276 of the first and second modified component display panels 251 and 261. In one embodiment, the back light may pass through the overlapping area of "L" and the "inverted L" portion in the integrated display panel 271. In one embodiment, the 3D view 277 depicts a three dimensional view of the integrated display panel 271. In one embodiment, the top layer of the 3D view depicts an active display area surrounded by the porch (shaded area) without any dark band at the junction of the first and second modified component display panels 251 and 261.

In one embodiment, the integrated display panels (IDP) may be created by integrating, for example, two or more display panels built with liquid crystal display (LCD) technology or optical light emitting diode (OLED) technology, LCD-LED displays, or such other technologies. In one embodiment, the IDPs may be created using display panels, which are based on micro-electro-mechanical-system (MEMS) technology. Further, the IDPs may be created using display panels, which are based on plasma, vacuum fluorescent, scanning, and other technologies.

Figure 3:
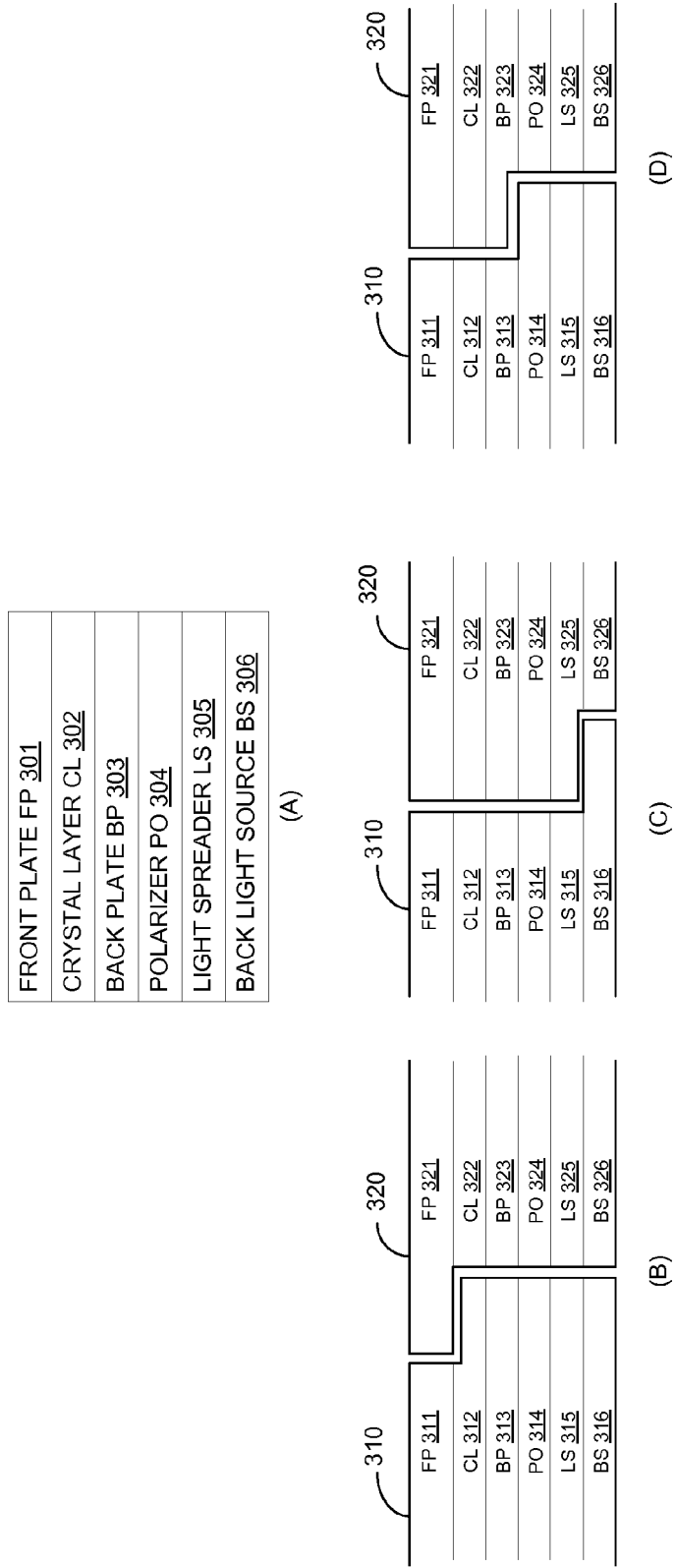
FIG. 3 illustrates various layers within the component display panel (FIG. 3A) and various combinations used to integrate the modified first and second component display panels, respectively, according to one embodiment.

FIG. 3 illustrates various layers within the modified component display panel (FIG. 3A) and various combinations used to integrate the first and second modified component display panels, respectively, according to one embodiment. FIG. 3A illustrates various layers of a liquid crystal display (LCD) panel. The LCD panel may include a front plate FP 301, a crystal layer CL 302, a back plate 303, a polarizer PO 304, a light spreader LS 305, and a back light source BS 306. FIG. 3B illustrates a first configuration in which the front panel FP 311 of the first modified component display panel 310 is removed and the remaining layers such as the crystal layer CL 312, back plate BP 313, polarizer PO 314, light spreader LS 315, and back light source BS 316 are retained. However, in one embodiment, the front plate FP 321 of the second modified component display panel 320 may be retained while removing the other lower layers such as the crystal layer CL 322, back plate BP 323, polarizer PO 324, light spreader LS 325, and back light source BS 326. In one embodiment, the BS 306, BS 316 and 326 are shown below the LS 305, 315, and 325 for illustration purposes. However, other variations may include placing the back light source BS along the periphery of the display panels. Also, other variations in the order in which the layers are stacked may be possible based on the manufacturer's choice. In one embodiment, the length of the front plate 311, which is removed from the first modified component display panel 310, may be equal to the length of the lower layers CL 322, BP 323, PO 324, LS 325, and BS 326 removed from the second modified component display panel 320. In one embodiment, such an approach may enable the two modified component display panels 310 and 320 to be integrated with minimum mechanical misalignments.

FIG. 3C illustrates another combination in which the back light source BS 316 of the first modified component display panel 310 may be retained while the upper layers FP 311, CL 312, BP 313, PO 314, and LS 315 may be removed. In one embodiment, only the bottom layer BS 326 of the second modified component display panel 320 may be removed while retaining the remaining upper layers FP 321, CL 322, BP 323, PO 324, and LS 325. FIG. 3D illustrates yet another combination in which the upper three layers FP 311, CL 312, BP 313 of the first modified component display panel 310 may be removed while retaining the lower three layers PO 314, LS 315, and BS 316. In one embodiment, the upper three layers FP 321, CL 322, and BP 323 of the second modified component display panel 320 may be retained while removing the lower three layers PO 324, LS 325, and BS 326. The embodiments depicted in FIG. 3B, 3C, and 3D are provided as examples, however, several other configurations in which different combinations of layers in each of the first and the second modified component display panels may be removed/retained is possible and such other combinations are contemplated to be within the scope of the embodiments of the present invention.

FIG. 4A illustrates a third, fourth, fifth, and sixth modified component display panels 401, 421, 431, and 441 (FIG. 4A) and an integrated display 471 formed by integrating the modified component display panels 401, 421, 431, and 441 according to one embodiment. In one embodiment, the active area 410 may be extended until the physical limit of the edges 413 and 414 of the third modified component display panel 401 while the other edges 411 and 412 may be covered with the porch (shaded area). Similarly, in one embodiment, the active area 420 may be extended until the physical limit of the edges 422 and 423 of the fourth modified component display panel 402 while the other edges 421 and 424 may be covered with the porch (shaded area). In one embodiment, the active area 430 may be extended until the physical limit of the edges 431 and 434 of the fifth modified component display panel 403 while the other edges 432 and 433 may be covered with the porch (shaded area). In one embodiment, the active area 440 may be extended until the physical limit of the edges 441 and 442 of the fifth modified component display panel 404 while the other edges 443 and 444 may be covered with the porch (shaded area). In one embodiment, the edges 413, 414, 422, 423, 431, 434, 441, and 442 may not be metalized to allow the light from the back light source to travel through various layers and reach the top layer (or the front plate).

In one embodiment, the side views 416 and 426 depict the "inverted L" groove formed by removing the layers, respectively, from the edges 413 and 423 of the third and fourth modified component display panels 401 and 402. In one embodiment, the side views 436 and 446 depict the "L" groove formed by removing the layers, respectively, from the edges 431 and 441 of the fifth and sixth modified component display panels 403 and 404. In one embodiment, the front view 435 depicts the "L" groove formed by removing the layers from the edges 414 and 434 of the third and the fifth modified component display panels 401 and 403. In one embodiment, the front view 435 depicts the "inverted L" groove formed by removing the layers from the edges 422 and 442 of the fourth and sixth modified component display panels 402 and 404.

In one embodiment, an integrated display 470, depicted in FIG. 4B, may be created by integrating the third, fourth, fifth, and the sixth modified component display panels 401, 402, 403, and 404. In one embodiment, the non-metalized edges (413 and 431), (414 and 422), (434 and 442), and (441 and 423), which may intersect at a point to form an angle, may be coupled to create a single bigger integrated display panel without any dark bands at the junction of the edges (413 and 431), (414 and 422), (434 and 442), and (441 and 423). In one embodiment, the non-metalized adjacent edges of the rectangular modified component display panels may intersect at the corners of the modified component display panels and may form right angles at the corners as depicted in the FIG. 4A. In one embodiment, the highlighted portion in the side view 476 depicts the junction formed by coupling the edges (413 and 431) and (441 and 423) and the overlapping region of the "L" and the "inverted L" depicted in the side views 416, 436 and 426 and 446 allow the light from the lower layers to pass through the upper layers and reach the top layer (or the front plate). In one embodiment, the highlighted portion in the front view 475 depicts the junction formed by coupling the edges (414 and 422) and (431 and 442) and the overlapping region of the "L" and the "inverted L" depicted in the front views 435 and 445 allow the light from the lower layers to pass through the upper layers and reach the top layer (or the front plate). In one embodiment, the display data may be, seamlessly, rendered on the integrated display panel 470 as the light may pass through, uninterrupted, at the overlapping area at the junctions.

Figure 5:
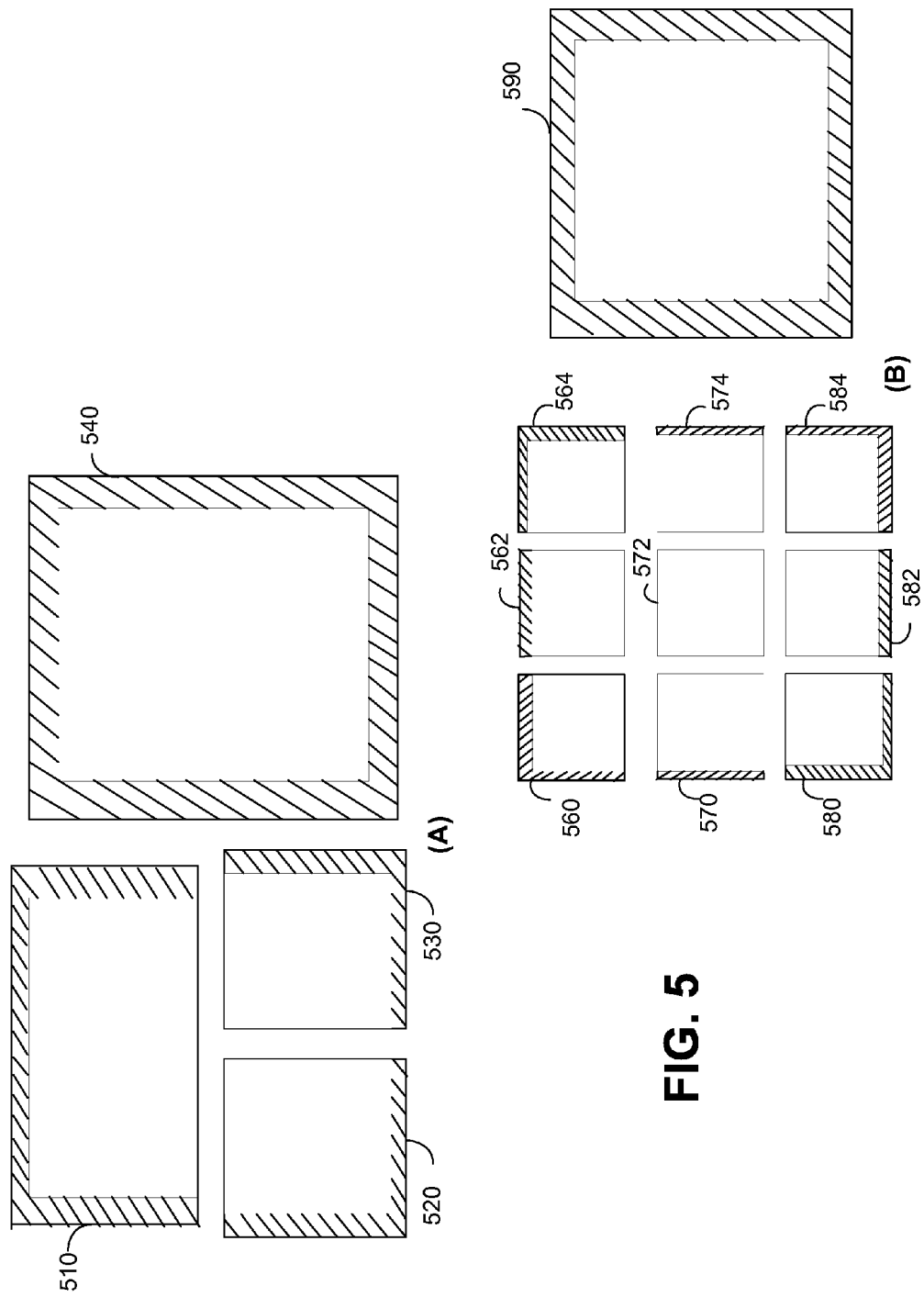
FIG. 5 illustrates a processor 510, which supports a seamless display of information using the integrated digital display according to one embodiment.

An embodiment in which odd number of modified component display panels may be integrated to create a bigger integrated display panel is depicted in FIG. 5. In one embodiment, a medium sized modified component display panel 510 may be integrated with two small sized modified component display panels to create a bigger integrated display 540 as depicted in FIG. 5A. In one embodiment, the un-shaded edges of the display panels 510, 520, and 530 indicate that the active area is extended until the physical limit of the edges and the shaded edges indicate the porch covering at least some pixel area along the shaded edges.

In one embodiment, nine small sized modified component display panels 560, 562, 564, 570, 572, 574, 580, 582, and 584 may be integrated to create a bigger integrated display 590 as depicted in FIG. 5B. In one embodiment, the integrated display panels 540 and 590 may display the data without displaying the bark bands at the junctions of the modified component display panels. Such an approach may allow various possibilities of creating a bigger integrated display. For example, two or more display panels may be folded to reduce the size of the display area while not viewing the display, however, while using the display the display panels (which were folded) may be unfolded to create a bigger integrated display. Such an approach may enable portability of bigger integrated display panels. Further, such an approach may enhance the user experience while viewing the data on a bigger integrated display panel. Such an approach may provide enhanced user experience even while using the small form factor devices. Generally, the price of the display panels increase exponentially with an increase in the size of the display panels, however, such an approach may reduce the cost of larger display panels, substantially.

Figure 6:
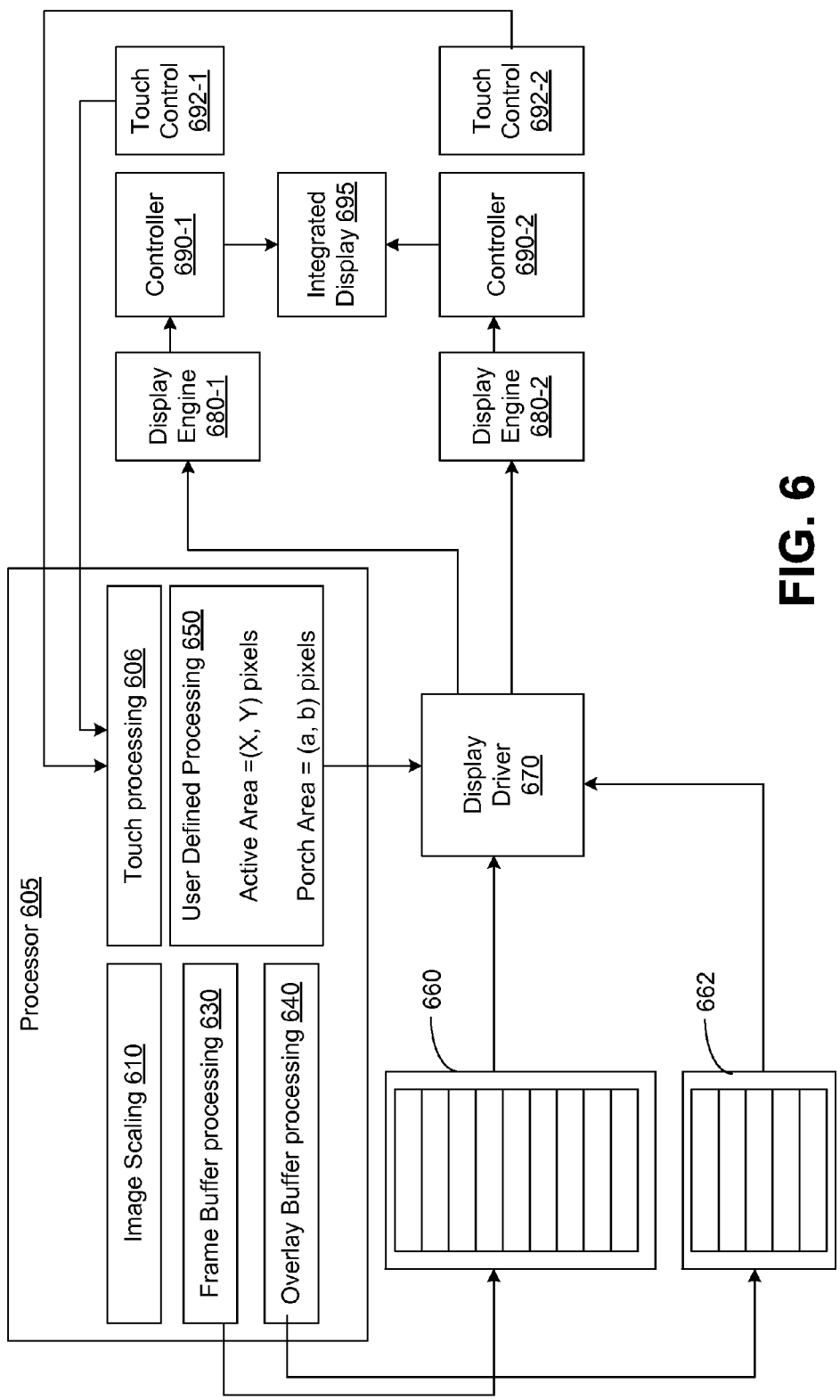
FIG. 6 illustrates a detailed diagram of the processor 510, which supports seamless display of information using the integrated digital display according to one embodiment.

FIG. 6 illustrates a processor 605, which may support a seamless display of information on the integrated display panel according to one embodiment. In one embodiment, the processor 605 may include an image scaling block 610, up-scaling block 620, frame buffer processing 630, an overlay buffer 640, and a user defined processing block 650. Further, the processor 605 may be coupled to a buffer 660, a display driver 670, and a display engine 680. The display engine 680 may be coupled to a controller 690, which in turn may be coupled to an integrated display panel (IDP) 695.

In one embodiment, the image scaling block 610 may scale the image data to fit into the active display area. In one embodiment, the image scaling block 610 may receive an image data of size (X, Y) and up-scale the image data to (X+x, Y+y), for example. Also, the image scaling block 610 may down scale the image data size to (X−x, Y−y), for example. In one embodiment, the "x" and "y" may be independent of "X" and "Y" and may also be linearly or non-linearly related to "X" and "Y".

In one embodiment, the frame buffer processing block 630 may process the graphics data generated by one or more applications before storing the processed graphics data into the buffer 660. In one embodiment, processing performed by the frame processing block 630 may include generation of display data for modified component display panels and the frame processing block 630 may populate the respective frame buffers of the individual displays. In one embodiment, the frame buffer 660 may be a shared memory between the individual modified component display panels or each of the individual modified component display panels may be associated with a dedicated frame buffer. For example, the frame buffer 660 is depicted as a shared memory, which may be shared between the modified component display panels.

In one embodiment, the overlay buffer processing block 640 may process the overlay data before storing the processed overlay data in the overlay buffer 662. In one embodiment, processing performed by the overlay buffer processing block 640 may include generation of overlay data for modified component display panels and the overlay buffer processing block 640 may populate the respective overlay buffers 662 of the individual displays. In one embodiment, the overlay buffer 662 may be a shared memory between the individual modified component display panels or each of the individual modified component display panels may be associated with a dedicated overlay buffer. For example, the overlay buffer 662 is depicted as a shared memory, which may be shared between the modified component display panels. In other embodiment, the processed graphics data and the processed overlay data may be stored in different regions of the buffer 660 and may be, separately, retrieved and rendered on the integrated display 695. In one embodiment, the overlay processing buffer 640 may process the overlay data related to pointers, pop-up menus, on screen messages, closed caption, teletext, and such other indicator graphics. In one embodiment, the indicator graphics may receive inputs from the pointing devices such as mouse, touch pads, track pads, track ball, digitizer, gesture sensor and such other inputs.

In one embodiment, the user defined processing block 650 may allow the user to provide inputs related to the active area, porch area, number of modified component display panels being integrated, and such other inputs. In one embodiment, the user defined processing block 650 may display several modified component display panels of different sizes, characteristics and make and then may allow the user to select from the list of the available panels. In one embodiment, the user defined processing block 650 may provide the user inputs (or display configuration inputs or control values) to the display driver 670.

In one embodiment, the display driver 670 may receive the control values (or display configuration inputs) from the user defined processing block 650. In one embodiment, the display driver 670 may also retrieve graphics and overlay data, respectively, from the frame buffer 660 and the overlay buffer 662. In one embodiment, before providing the data to the display engine 680, the display driver 670 may populate the porch area along the fourth edge 253 of the first modified component display panel 251 with a first value (for example, 1111 . . . ) such that the back light may be allowed to pass through. On the other hand, the porch area along the edge 263 of the second modified component display panel 261 may be provided with the graphics or the overlay display data to seamlessly display the data. However, while the first and second modified component display panels 251 and 261 are operating as stand-alone (not integrated or unmated) panels, the porch area along the fourth edges 253 and 263 may be populated with a second value (for example, 0000 . . . ) to enable a dark band to be seen along the fourth edge 253 and 263. In one embodiment, the display driver 670 may determine the porch area based on the display configuration inputs (or control values). In one embodiment, the display engine 680-1 may package the data received from the display driver 670 into a format, which is complaint with the interface characteristics defined by the controller 690-1. In one embodiment, the display engine 680-1 may receive data for the first modified component display panel 251. Similarly, the display engine 680-2 may package the data received from the display driver 670 into a format, which is complaint with the interface characteristics defined by the controller 690-2. In one embodiment, the display engine 680-2 may receive data for the second modified component display panel 261.

In one embodiment, the controller 690-1 and 690-2 may, respectively, render the pixel map from the display engines 680-1 and 680-2 on to the integrated display panel 695. In one embodiment, the pixel map may be generated based on the control values, which define the active region and porch region. In one embodiment, the active region for the integrated display panel 695 may be approximately twice the active area of the first modified component display panel if the integrated display panel 695 is formed by integrating the first and the second modified component display panels 251 and 261, for example. Similarly, in one embodiment, the active region for the integrated display panel 695 may be approximately four times the active area of the third modified component display panel 401 if the integrated display panel 695 is formed by integrating the third, fourth, fifth, and sixth modified component display panels 401, 402, 403, and 404, respectively, for example.

In one embodiment, the touch control of the individual modified component display panels may have their respective touch controllers 691-1 and 691-2. In one embodiment, the integrated display touch parameters are generated by the touch processing 606, which may use the inputs from individual touch controllers 692-1 and 692-2. In one embodiment, the touch processing 606 may generate one or more touch coordinates for the IDP such that the one or more touch coordinates correspond to the IDP. In one embodiment, if the individual modified component display panels are of same size and if two individual modified component display panels are combined along Y-axis, the coordinates along the X-axis of the two individual modified component display panels may be added such that (X1+X2) fits into the size of the integrated display panel. If the two panels are combined along the X-axis, the coordinates along the Y-axis of the two individual modified component display panels may be added such that (Y1+Y2) fits into the size of the integrated display panel. However, if the individual modified component display panels are of different sizes then the touch processing 606 may either linearly or non-linearly extrapolate or interpolate the coordinates such that the touch coordinates fit into the area of the integrated display panel.

In one embodiment, the integrated display panel 695 may display the processed graphics data and/or the processed overlay data as defined in the pixel map generated by the display engine 680. In one embodiment, as the back light may pass through the lower layers to the upper layers through the overlapping area of the "L" and the "inverted L" region, as described above, the integrated display panel may seamlessly display the data without any dark bands at the junction of the modified component display panels. In one embodiment, the integrated display panel 695 may be created using the technique described above with reference to FIGS. 2, 3, and 4. Thus, two or more modified component display panels may be used to create a bigger integrated display panel such as the integrated display panel 695.

Figure 7:
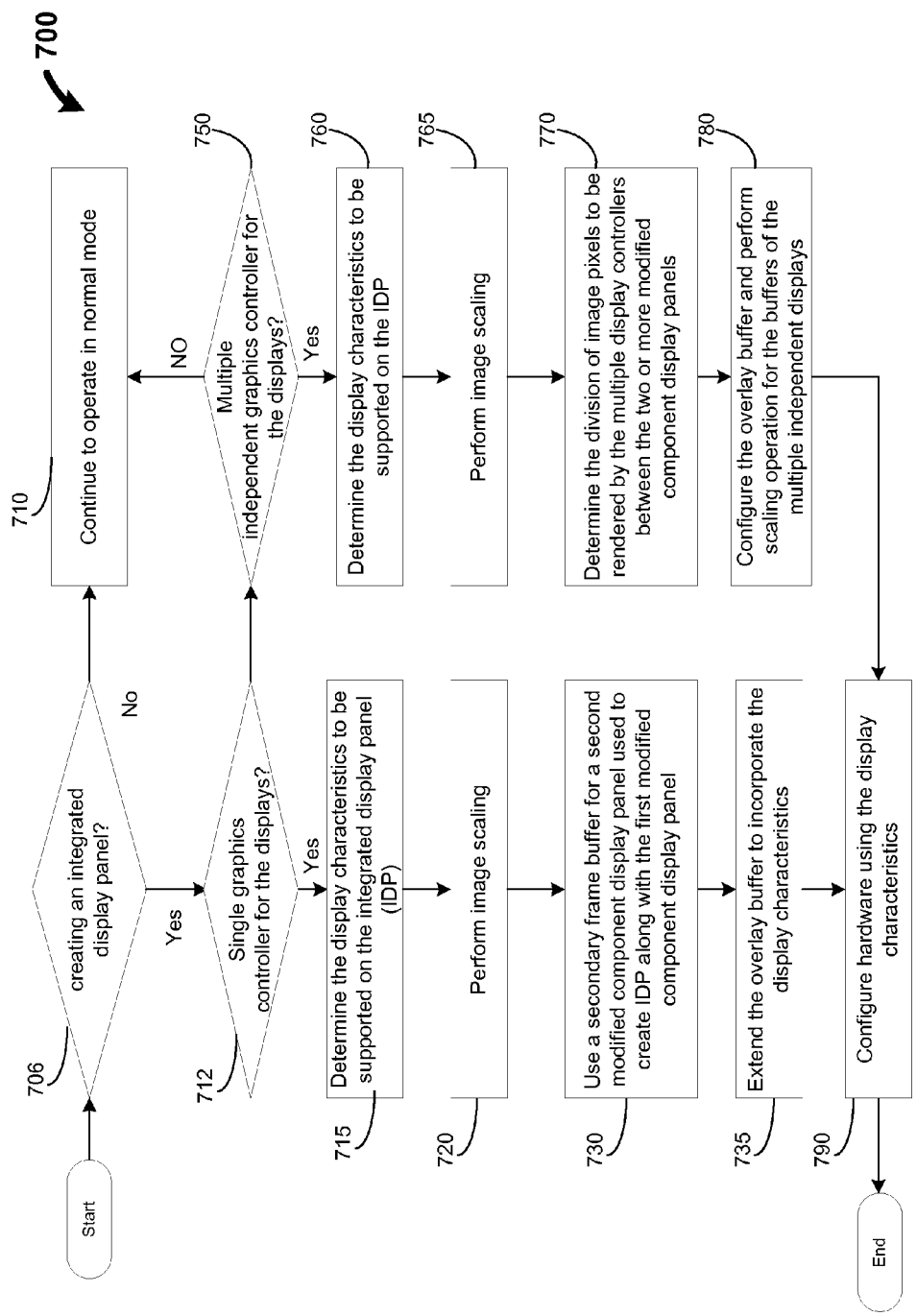
FIG. 7 is a flow-chart 700, which illustrates a technique to create the integrated digital display using the modified digital displays according to one embodiment.

An embodiment of rendering data on the integrated display panel using a single display controller and double display controller is illustrated in FIG. 7. In one embodiment, the first modified component display panel such as the panel 251 and a second modified component display panel such as the panel 261 may each be coupled to a display controller to render the data while the first and second component display panels are operating independently. However, if the first and second modified component display panels are integrated to form an integrated display panel, either a single display controller or a double display controller may be used to render the data on the integrated display panel. Further, in one embodiment, if more than two modified component display panels are used to create an integrated display panel, the display data on the integrated display panel may be rendered using a single or multiple display controllers.

In block 706, a user may choose to create an integrated display panel using the first and the second modified component display panels and control passes to block 710 if the user chooses not to create the integrated display panel and control passes to block 712 if the user chooses to create an integrated display.

In block 710, the first and second modified display panels may, individually and independently, continue to operate in a normal mode as a stand-alone display panels. In block 712, the user may choose to use either a single display controller or multiple display controllers and control passes to block 715 if the user chooses to use a single display controller and to block 750 if the user chooses to use multiple display controllers.

In block 715, based on the display configuration values provided by the user, a user defined processing block such as the block 650 may determine the display characteristics, which may be supported on the integrated display panel (IDP). In one embodiment, the display configuration inputs may include the size of the active area, porch area, resolution, and such other parameters.

In block 720, the image scaling block such as the block 610 may perform image scaling to fit the display data into the new active area of the integrated display panel (IDP). For example, the active area of the individual modified component display panels may be (480×800) pixels and the new active area of the IDP may support (480×1600) pixels. As a result, the image scaling block 610 may scale the display data to fit the image to the new active area.

In block 730, the display engine such as the display engine 670 may retrieve the display data from a secondary frame buffer for displaying image on the second modified component display panel while retrieving the display data from a primary frame buffer for displaying image on the first modified component display panel. In one embodiment, a single controller such as the controller 690 may render the display data from the primary and secondary frame buffers, respectively, on the first and the second modified component display panels. In block 735, the display engine may extend the overlay buffer to incorporate the display characteristics. Control then passes to block 790.

In block 750, it may be determined that the multiple display controllers are to used and control passes to block 710 if the multiple display controllers are not used to block 760 otherwise.

In block 760, based on the display configuration values provided by the user, a user defined processing block such as the block 650 may determine the display characteristics, which may be supported on the integrated display panel (IDP). In one embodiment, the display configuration inputs may include the size of the active area, porch area, resolution, and such other parameters.

In block 765, the image scaling block such as the block 610 may perform image scaling based on the parameters of the individual modified component display panels and the respective display controllers used to fit the display data into the new active area of the integrated display panel (IDP). For example, the active area of the individual modified component display panels may be (480×800) pixels and the new active area of the IDP may support (480×1600) pixels. As a result, the image scaling block 610 may scale the display data to fit the image to the new active area.

In block 770, the display engine such as the display engine 670 may determine or identify the pixels of the scaled image and the individual modified component display panel on which the identified pixels may be rendered. In one embodiment, the identified pixels may be rendered on the individual modified component display panel identified for rendering such pixels. In one embodiment, the display engines may retrieve the display data from a corresponding frame buffer. In one embodiment, multiple display controllers such as the controller 690 may render the display data retrieved from the corresponding buffer may be rendered separately on a specified region of the IDP.

In block 780, the display engine may configure the overlay buffer and perform scaling operations for the corresponding buffers of multiple display controllers. Further, the control passes to block 790 and in block 790 the controller may configure a rendering hardware using the display characteristics.

Figure 8:
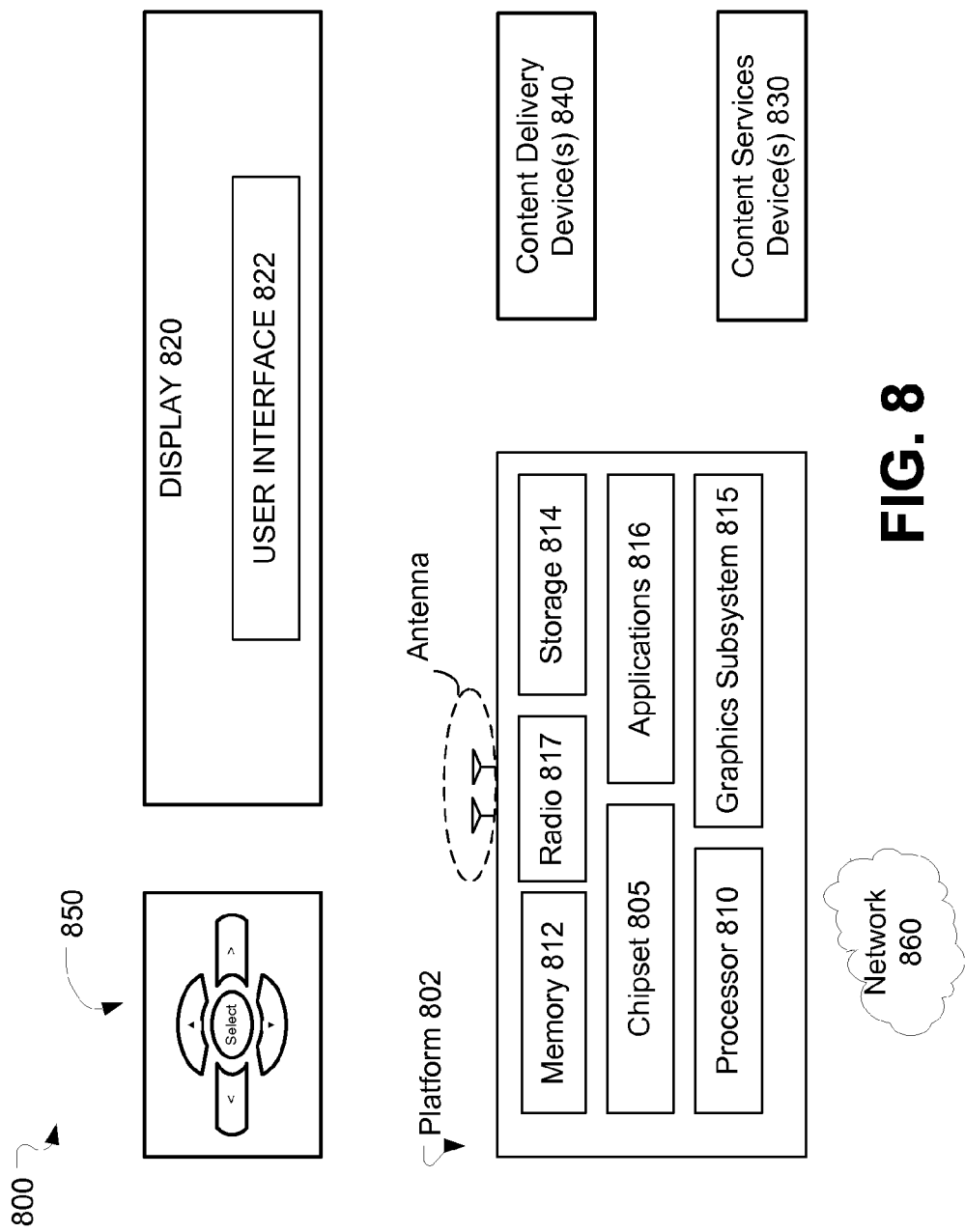
FIG. 8 is a computer system, which may support the integrated digital display according to one embodiment.

FIG. 8 illustrates an embodiment of a system 800. In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 comprises a platform 802 coupled to a display 820, which may be an integrated display panel such as the panel 271, 470, 540, 590, or 695 described above. Platform 802 may receive content from a content device such as content services device(s) 830 or content delivery device(s) 840 or other similar content sources. A navigation controller 850 comprising one or more navigation features may be used to interact with, for example, platform 802 and/or display 820. Each of these components is described in more detail below.

In embodiments, platform 802 may comprise any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 810 may comprise dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 814 may comprise technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In embodiments, display 820 may comprise any television type monitor or display. Display 820 may comprise, for example, a computer display screen, touch screen display, video monitor, television-like device, and/or a television. Display 820 may be digital and/or analog. In embodiments, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In embodiments, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 receives content such as cable television programming including media information, digital information, and/or other content. Examples of content providers may include any cable or satellite television or radio or Internet content providers. The provided examples are not meant to limit embodiments of the invention.

In embodiments, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be echoed on a display (e.g., IDP 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but integrated into platform 802 and/or display 820. Embodiments, however, are not limited to the elements or in the context shown or described herein.

In embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off" In addition, chip set 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the invention.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
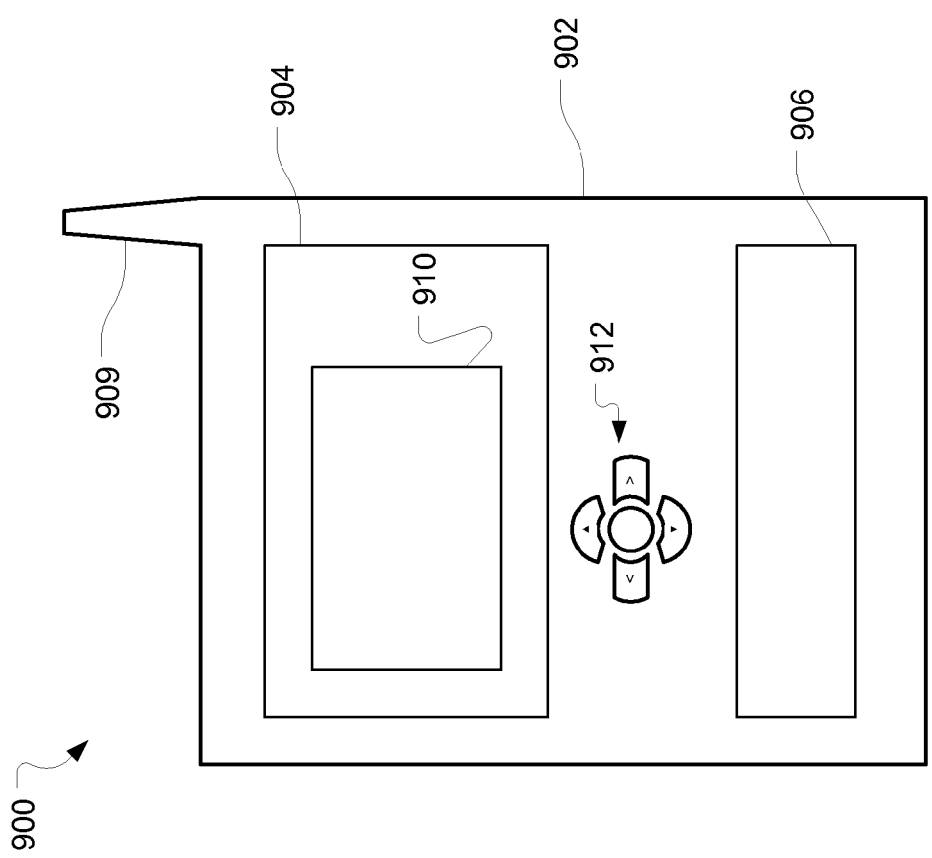
FIG. 9 is a wireless mobile device, which may support the integrated digital display according to one embodiment.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904 (such as IDP 271 470, 540, or 590), an input/output (I/O) device 906, and an antenna 908. Device 900 also may comprise navigation features 912. Display 904 may comprise any suitable display unit for displaying information appropriate for a mobile computing device. I/O device 906 may comprise any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context. The device 900, in one embodiment, may include foldable integrated display panels, which may be unfolded to have a bigger display area.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:
1. An integrated display panel, comprising:
a plurality of modified component display panels including at least a first and second modified component display panel,
wherein the first and second component display panels are bounded by one or more edges,
wherein the first and second modified component display panels include an active region, which is extended until a physical limit of at least one of the edges,
wherein a first set of layers of the first modified component display panel is removed along the at least one of the edges while the first modified component display panel is manufactured,
wherein a second set of layers of the second modified component display panel is removed along the at least one of the edges, while the second modified component display panel is manufactured, wherein the second set of layers do not include a layer that is included in the first set of layers, wherein the first modified component display panel is overlapped with the second modified component display panel along the at least one of the edges to form a junction, wherein a back light from a lower layer at the junction is allowed to pass through an overlapping area of the first set of layers and the second set of layers and reach a top layer of the integrated display panel, wherein graphics is displayed, seamlessly, in an active area of the integrated display panel without forming a dark band at the junction of the first and the second modified component display panel.

2. The integrated display panel of claim 1, wherein the first set of layers and the second set of layers together form a complete set of layers of the integrated display panel.

3. The integrated display panel of claim 1, wherein the plurality of modified component display panels further include a third and fourth modified component display panels, wherein the first set of layers of the first and third modified component display panels is removed along two adjacent edges while the first and second modified component display panels are manufactured, wherein the second set of layers of the second and fourth modified component display panels is removed along the two adjacent edges, while the second and fourth modified component display panels are manufactured, wherein a first of the two adjacent edges of the first modified component display panel is overlapped with a first of the two adjacent edges of the second modified component display panel and a second of the two adjacent edges of the first modified component display panel is overlapped with a second of the two edges of the third modified component display panel and a second of the two adjacent edges of the second display panel is overlapped with a first of the two adjacent edges of the fourth display panel and second of the two adjacent edges of the third modified component display panel is overlapped with a second of the fourth modified component display panel to form a junction at the two adjacent edges of each of the first, second, third, and the fourth modified component display panels.

4. The integrated display panel of claim 1, wherein the two adjacent edges are non-metalized to allow the back light from a lower layer at the junction to pass through an overlapping area of the first set of layers and the second set of layers and reach a top layer of the integrated display panel.

5. The integrated display panel of claim 1, wherein the plurality of modified component display panels include panels, which are polygons.

6. The integrated display panel of claim 5, wherein the plurality of modified component displays panels is of the same size.

7. The integrated display panel of claim 5, wherein the plurality of modified component displays panels is of different sizes.

8. The integrated display panel of claim 1, wherein the plurality of modified component display panels include one or more circular panels, which may be integrated to form an integrated display panel.

9. The integrated display panel of claim 1, wherein the plurality of modified component display panels include one or more semi-circular panels, which may be integrated to form an integrated display panel.

10. The integrated display panel of claim 1, wherein each of the plurality of modified component display panels includes a display controller and the display controller of one of the plurality of modified component display panels is to control an image rendered on the integrated display panel.

11. The integrated display panel of claim 10, wherein each of the plurality of modified component display panels includes a display controller and the display controller of each of the plurality of modified component display panels is to control a portion of the image rendered on the integrated display panel.

12. The integrated display panel of claim 1, wherein each of the plurality of modified component display panels includes a touch controller, wherein the touch controller is to coordinate the touch inputs of the plurality of modified component display panels to a touch input corresponding to a touch coordinate on the integrated display panel.

* * * * *